United States Patent
Zhang et al.

(10) Patent No.: US 8,472,549 B2
(45) Date of Patent: Jun. 25, 2013

(54) BASE STATION, MULTI-ANTENNA COMMUNICATION SYSTEM AND COMMUNICATION METHOD THEREOF

(75) Inventors: Yuantao Zhang, Beijing (CN); Jianming Wu, Beijing (CN); Jun Tian, Beijing (CN); Hua Zhou, Beijing (CN)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/438,480

(22) Filed: Apr. 3, 2012

(65) Prior Publication Data

US 2012/0189082 A1 Jul. 26, 2012

Related U.S. Application Data

(63) Continuation of application No. PCT/CN2009/074375, filed on Oct. 9, 2009.

(51) Int. Cl.
*H04B 7/02* (2006.01)

(52) U.S. Cl.
USPC ........... 375/267; 375/260; 375/262; 375/265; 375/340; 375/343; 375/346; 375/347; 375/350

(58) Field of Classification Search
USPC .............. 375/267, 299, 260, 262, 265, 340, 375/343, 346, 347, 350; 370/203, 204, 205, 370/208, 209, 210
See application file for complete search history.

(56) References Cited

U.S. PATENT DOCUMENTS

| | | | |
|---|---|---|---|
| 8,223,853 B2 * | 7/2012 | Vijayan et al. | 375/260 |
| 2008/0159186 A1 | 7/2008 | Steer | |
| 2008/0170640 A1 | 7/2008 | Gao et al. | |
| 2008/0298296 A1 | 12/2008 | Wu | |
| 2009/0042511 A1 | 2/2009 | Malladi | |
| 2009/0222855 A1 | 9/2009 | Vare et al. | |
| 2012/0188881 A1 * | 7/2012 | Ma et al. | 370/252 |

OTHER PUBLICATIONS

Fujitsu; "Hierarchical Modulation based DL MIMO for LTE-Advanced"; Aug. 24-28, 2009; Agenda Item: 15.6; R1-093163; 3GPP TSG-RAN1 #58; Shenzhen, China.

* cited by examiner

*Primary Examiner* — Dhaval Patel
(74) *Attorney, Agent, or Firm* — Myers Wolin, LLC

(57) ABSTRACT

A User equipment selecting first user equipment in a mode of precoding transmission and second user equipment in a mode of diversity transmission; a parameter determining a modulation mode, the number of transmission layers and a precoding matrix according to channel quality information, precoding matrix information and number of transmission layers sent from the first user equipment and channel quality information and number of transmission layers sent from the second user equipment; according to the modulation mode and the number of transmission layers, generating first and second symbol sequence from first and second source data; hierarchically modulating the first and the second symbol sequence to generate a mixed symbol sequence; layer mapping and precoding for the mixed symbol sequence to generate transmission signals; and transmitting the precoding matrix and the number of transmission layers to the second user equipment; sending the transmission signals to the first and second user equipments.

13 Claims, 9 Drawing Sheets

BASE STATION, MULTI-ANTENNA COMMUNICATION SYSTEM AND COMMUNICATION METHOD THEREOF

CROSS-REFERENCE TO RELATED APPLICATIONS

This application is a continuation of International Application No. PCT/CN2009/074375 filed on Oct. 9, 2009, now pending, the contents of which is hereby incorporated by reference in its entirety.

FIELD OF THE INVENTION

The present invention relates to the wireless communication technology, and particularly, to a multi-antenna communication system and a communication method used in the same.

BACKGROUND

The basic idea of hierarchical modulation technology is to divide the used constellation points into layers such as base layer and enhancement layer. A user equipment with poor channel quality or low priority can only obtain the information contained in the constellation points of the base layer by demodulation, while a user equipment with good channel quality or high priority can obtain the information contained in the constellation points of the enhancement layer by demodulation.

The basic principle of hierarchical modulation is explained through an example in which the "base data stream" is transmitted in the conventional Quadrature Phase Shift Keying (PQSK) modulation mode, and the "enhancement data stream" is transmitted in the 16 Quadrature Amplitude Modulation (16 QAM) mode. FIG. 1 illustrates a schematic diagram of hierarchical modulation. In FIG. 1, "•" is the constellation point of 16 QAM, and "x" is the constellation point of QPSK. If the constellation point of QPSK is assumed as a large constellation point (as shown by the dashed line circle in FIG. 1), four constellation points within the same quadrant among the constellation points of 16 QAM may be deemed as small constellation points inside the large constellation point. In this mapping mode, a user equipment with poor channel quality can only identify the "large constellation point" to thereby obtain the base data stream by demodulation, due to a weak identification capability. However, a user equipment with good channel quality can identify both the "large constellation point" and the "small constellation point" inside thereof, due to a strong identification capability.

Thus, when a certain symbol is received, the user equipment with poor channel quality can only obtains a two-bit data by demodulation, while of the user equipment with good channel quality can obtain a four-bit data by demodulation. As illustrated in FIG. 1, when a certain symbol is received, the user equipment with poor channel quality can only identify that the symbol is located at a "large constellation point" in the fourth quadrant and only obtain bit data of "01" by demodulation, while of the user equipment with good channel quality can identify that the symbol is not only located at a "large constellation point" in the fourth quadrant, but also located at a "small constellation point" on the upper left corner of the "large constellation point", and then can obtain data of "1001" by demodulation. That is, the user equipment with poor channel quality can only obtain the anterior two bits of "1001" by demodulation. In general, the anterior two bits corresponding to the QPSK modulation, which has a lower order than the 16 QAM, in the 16 QAM constellation point are referred to as most significant bits (MSBs), and the posterior two bits are referred to as least significant bits (LSBs).

Next, the resource mapping methods for multiple user equipments when adopting the hierarchical modulation and the conventional scheduling are explained with reference to FIGS. 2, 3A and 3B. FIG. 2 illustrates a communication model in which a cell of the base station 1 has two user equipments, wherein the channel quality of a first user equipment UE1 is far better than that of a second user equipment UE2. FIG. 3A illustrates a resource mapping method in the conventional scheduling, and FIG. 3B illustrates a resource mapping method when the hierarchical modulation is adopted. As illustrated in FIG. 3A, in the conventional scheduling, a base station allocates orthogonal resources to two user equipments, and the orthogonal resources may be codeword orthogonal, time-frequency orthogonal, etc. For example, in case of time-frequency orthogonal resources, a first user equipment UE1 is allocated a time-frequency resource 1, and a second user equipment UE2 is allocated a time-frequency resource 2 orthogonal to the time-frequency resource 1. As illustrated in FIG. 3B, when the hierarchical modulation is adopted, the first user equipment UE1 and the second user equipment UE2 will occupy the time-frequency resources 1 and 2 simultaneously. In order to improve throughput and coverage of the cell, the same modulation mode is adopted for the time-frequency resources 1 and 2. Further, bits of the data of the second user equipment UE2 are mapped to the MSBs of the constellation points, and bits of the data of the first user equipment UE1 are mapped to the LSBs of the constellation points. As a result, the throughput and coverage of the cell can be improved.

Next, the bit mapping conditions during hierarchical modulation are described with reference to FIG. 4 by taking 16 QAM as an example. As illustrated in FIG. 4, in each 16 QAM constellation point, the MSBs are occupied by the second user equipment UE2 with poor channel quality, and the LSBs are occupied by the first user equipment UE1 with good channel quality. During demodulation, the second user equipment UE2 can obtain two bits (i.e., MSBs) of each constellation point by demodulation, and the first user equipment UE1 can obtain all four bits of each constellation point by demodulation.

In the future, the wireless communication system will use multi-antenna as an important means to improve validity and reliability of information. An important technology among multi-antenna technologies is a precoding technology of which a basic idea is that the user equipment computes an appropriate precoding matrix according to an channel obtained by estimation, and feeds back information of the precoding matrix to the base station. The base station will precode the transmitted data according to the precoding matrix, in the next time of scheduling the user equipment.

FIGS. 5A and 5B illustrate typical structural diagrams of conventional multi-antenna precoding transmission and diversity transmission, respectively. The structural diagram of precoding transmission is illustrated in FIG. 5A, wherein a first source data to be transmitted to a first user equipment UE1 is firstly encoded and rate-matched. Herein the encoding is ⅓ base encoding, and a sequence output by the rate matching is a sequence obtained through truncation or punch of the sequence output after the base encoding. The sequence length is related to modulation mode and the number of the transmission layers to be used. The structural diagram of diversity transmission is illustrated in FIG. 5B. Similar to FIG. 5A, a second source data to be transmitted to the second user equipment UE2 is firstly encoded and rate-matched. In order to be distinguished from FIG. 5A and facilitate the descriptions, the rate-matching used for the first user equipment UE1 is called as a first rate-matching, and the rate-matching used for the second user equipment UE2 is called as a second rate-matching. The symbol sequence output after the second rate-matching is a symbol sequence x. The symbol sequence x is subject to a constellation point mapping, and then is diversity transmitted.

In case hierarchical modulation is adopted in the multi-antenna precoding system, the following problems will occur for example when two user equipments are selected to perform hierarchical modulation:

1. when the two selected user equipments are configured in the precoding transmission mode in advance, a precoding matrix fed back by only one of the user equipments can be selected during the downlink data precoding, and the precoding matrix is not certainly suitable to another user equipment; and 2. when the precoding matrix adopted in the downlink data precoding is that fed back by one of the user equipments, another user equipment cannot decode the transmitted data because it does not know the precoding matrix.

Therefore, in the related art, there is a need of a method and apparatus adopting hierarchical modulation in the multi-antenna system.

Literatures cited herein are listed as follows, and they are incorporated herein by reference as if they were described herein.

1. [Patent Literature 1]: Malladi Durga Prasad, Hierarchical modulation for communication channels in single-carrier frequency division multiple access (US 20090042511 A1).

2. [Patent Literature 2]: Vare Jani, et. al., Method and apparatuses for hierarchical transmission/reception in digital broadcast (US 20090222855 A1).

3. [Patent Literature 3]: Wu Qi, Method for transmitting multicast data in Wimax/Wibro Relay system (US 20080298296 A1).

4. [Patent Literature 4]: Steer David G; Content differentiated hierarchical modulation used in radio frequency communications (US 20080159186 A1).

5. [Patent Literature 5]: Gao Wen, el. al., Methods and Apparatus for hierarchical modulation using radial constellation (US 20080170640 A1).

6. [Non-patent Literature 1]: Fujitsu, Hierarchical modulation based DL MIMO for LTE-Advanced, 3GPP, R1-093163.

To be noted, the above descriptions of the prior art are just made for the convenience of clearly and completely describing the technical solutions of the present invention, and facilitating a person skilled in the art to understand. It shall not be deemed that these solutions are known to a person skilled in the art just because they are described in the Background section.

SUMMARY OF THE INVENTION

Embodiments are proposed to solve one or more defects existing in the prior art, and provide at least one beneficial selection.

According to an aspect of the present invention, there is a communication method used in a multi-antenna communication system, comprising: selecting one from a first group of candidate user equipments which are configured in a precoding transmission mode as a first user equipment, and selecting one from a second group of candidate user equipments which are configured in a diversity transmission mode as a second user equipment; determining a modulation mode to be used in hierarchical modulation, the number of transmission layers to be used in layer-mapping and a precoding matrix to be used in precoding, according to a first channel quality information, a precoding matrix information and the first number of transmission layers which are sent by the first user equipment, a second channel quality information and the second number of transmission layers which are sent by the second user equipment; generating a first symbol sequence from first source data to be sent to the first user equipment, according to the modulation mode and the number of transmission layers; generating a second symbol sequence from second source data to be sent to the second user equipment, according to the modulation mode and the number of transmission layers; hierarchically modulating the first and second symbol sequences according to the modulation mode, to generate a mixed symbol sequence; layer-mapping and precoding the mixed symbol sequence according to the precoding matrix and number of transmission layers, to generate a transmission signal; and transmitting the transmission signal to the first and second user equipments and informing the second user equipment of the precoding matrix and the number of transmission layers.

According to another aspect of the present invention, there is a multi-antenna communication system using the above communication method.

According to still another aspect of the present invention, there is a base station, comprising: a user equipment selection unit, for selecting one from a first group of candidate user equipments which are configured in a precoding transmission mode as a first user equipment, and selecting one from a second group of candidate user equipments which are configured in a diversity transmission mode as a second user equipment; a parameter determination unit, for determining a modulation mode to be used in hierarchical modulation, the number of transmission layers to be used in layer-mapping and a precoding matrix to be used in precoding, according to a first channel quality information, precoding matrix information and the first number of transmission layers which are sent by the first user equipment, a second channel quality information and the second number of transmission layers which are sent by the second user equipment; a first symbol sequence generation unit, for generating a first symbol sequence from first source data to be sent to the first user equipment, according to the modulation mode and the number of transmission layers; a second symbol sequence generation unit, for generating a second symbol sequence from second source data to be sent to the second user equipment, according to the modulation mode and the number of transmission layers; a hierarchical modulation unit, for hierarchically modulating the first and second symbol sequences according to the modulation mode, to generate a mixed symbol sequence; a precoding unit, for layer-mapping and precoding the mixed symbol sequence according to the precoding matrix and the number of transmission layers, to generate a transmission signal; and a transmission unit, for transmitting the transmission signal to the first and second user equipments and informing the second user equipment of the precoding matrix and the number of transmission layers.

According to yet another aspect of the present invention, there is a storage medium comprising machine-readable program codes being executed in a multi-antenna communication system or an information processing system to enable the multi-antenna communication system or the information processing system to execute the above communication method.

According to yet another aspect of the present invention, there is a program product comprising machine-executable instructions, wherein the instructions is executed in a multi-antenna communication system or an information processing system to enable the multi-antenna communication system or the information processing system to execute the above communication method.

According to the present invention, a feasible communication method and corresponding apparatus for selecting user equipments configured in the precoding transmission mode and user equipments configured in the diversity transmission mode in the multi-antenna communication system to perform hierarchical modulation is provided.

BRIEF DESCRIPTION OF THE DRAWINGS

The above and other objects, features and advantages can be understood more easily based on the following descriptions of the embodiments herein made with reference to the drawings. The parts in the drawings are not drafted in scale, and just for illustrating the inventive principles. For the convenience of illustrating and describing some parts of the various embodiments, corresponding parts in the drawings may be enlarged, i.e., these parts are enlarged with respect to other parts in an exemplary apparatus practically manufactured according to certain embodiments. In the drawings, the same or corresponding reference signs are used to represent the same or corresponding technical features or parts.

DETAILED DESCRIPTION OF THE EMBODIMENTS

Figure 1:
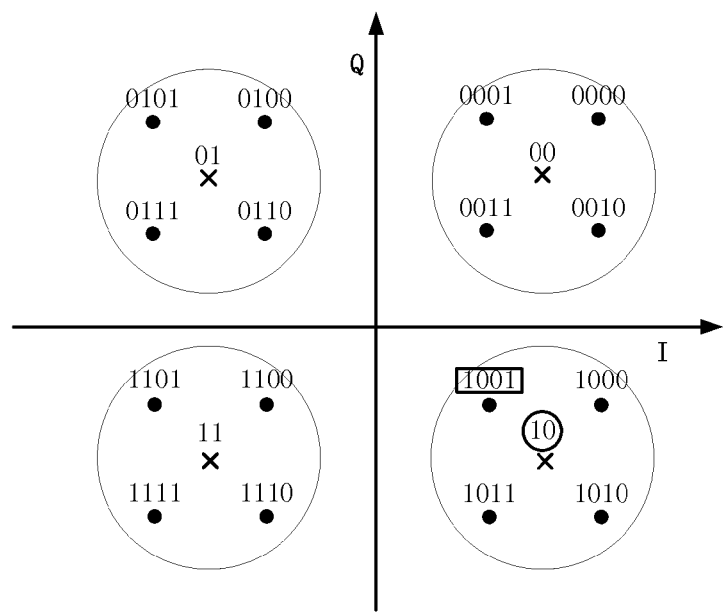
FIG. 1 illustrates a schematic diagram of hierarchical modulation.
Figure 2:
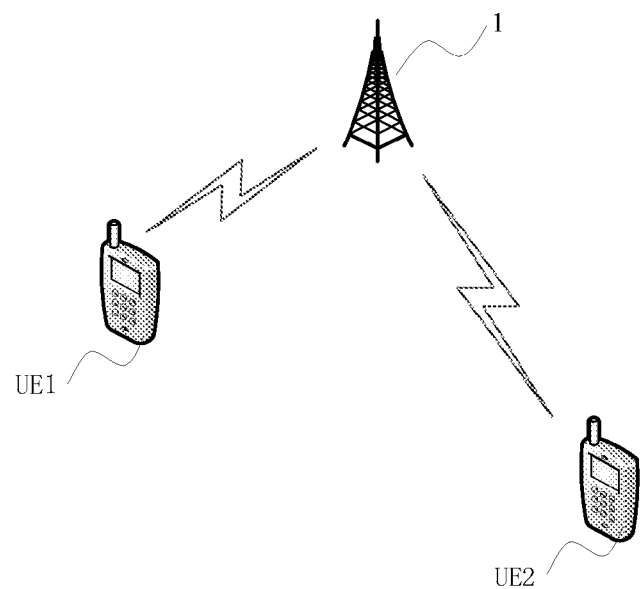
FIG. 2 illustrates a communication model under two user equipments.
Figure 3A:
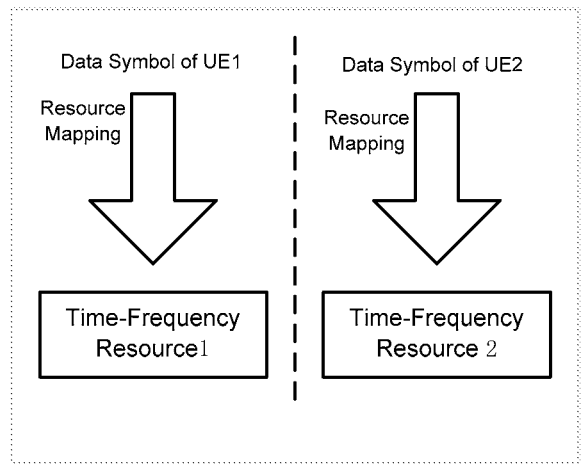
FIG. 3A illustrates a conventional resource mapping method.
Figure 3B:
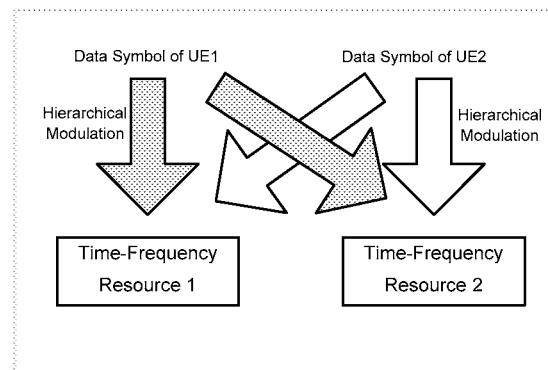
FIG. 3B illustrates a resource mapping method in which hierarchical modulation is adopted.

The embodiments of the present invention are described as follows with reference to the drawings. It shall be noted that, for the purpose of clearness, representations and descriptions of parts and processing which are irrelevant to the present invention and known to a person skilled in the art are omitted in the drawings and the descriptions.

In the descriptions and drawings, specific embodiments are disclosed in details to indicate the ways in which the principle of the present invention may be employed. But it shall be appreciated that the present invention is not correspondingly limited in the scope. The present invention includes many changes, modifications and equivalents within the scope of the spirit and clauses of the accompanied claims.

Features that are described and/or illustrated with respect to one embodiment may be used in the same or similar way in one or more other embodiments to combine or replace the features of other embodiments.

To be noted, the term "include, including/comprise, comprising" herein refers to existence of feature, element, step and component, not excluding existence or addition of one or more other features, elements, steps or components.

Figure 6:
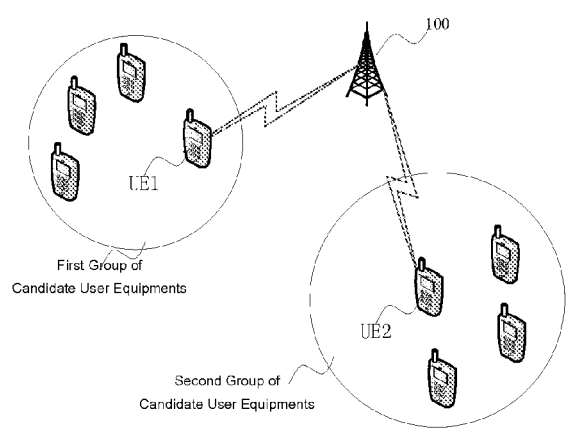
FIG. 6 illustrates a schematic diagram of a multi-antenna communication system according to an embodiment of the present invention.

By taking a general multi-antenna communication system including a base station as the example, a multi-antenna communication system and a communication method used in the same according to the embodiments of the present invention are described as follows with reference to the drawings. FIG. 6 illustrates a schematic diagram of a multi-antenna communication system according to an embodiment of the present invention. The multi-antenna communication system as illustrated in FIG. 6 includes a plurality of user equipments, wherein the user equipments having good channel qualities at the time of access and/or good historic channel qualities are configured in a precoding transmission mode, while the user equipments having poor channel qualities at the time of access and/or poor historic channel qualities are configured in a diversity transmission mode. The base station selects a first user equipment UE1 from the user equipments having good channel qualities, and selects a second user equipment UE2 from the user equipments having poor channel qualities for hierarchical modulation. Although all of the user equipments in FIG. 6 are represented with the same reference signs for the purpose of convenience, a person skilled in the art shall be appreciated that the user equipments may be the same as or different from each other, and of course, just a part of the user equipments may be the same as each other.

The first user equipment UE1 configured in the precoding transmission mode transmits the following information to the base station 100: channel quality information thereof for determining a code modulation mode to be used in a transmission at the next moment; precoding matrix information for determining a precoding matrix to be used in the transmission at the next moment; and the number of transmission layers. The second user equipment UE2 configured in the diversity transmission mode transmits channel quality information thereof and the number of transmission layers to the base station 100. Of course, a person skilled in the art shall be appreciated that, in order to perform communication, the first user equipment UE1 and the second user equipment UE2 may transmit other information in addition to the above information. It should not be appreciated that the first user equipment UE1 and the second user equipment UE2 only transmit the above information.

In the multi-antenna communication system of the present invention, the base station 100 determines parameters to be used in the transmission at the next moment, such as the modulation mode of hierarchical modulation, the number of transmission layers to be used and the precoding matrix to be used, according to the information transmitted by the first user equipment UE1 and the second user equipment UE2. Next, the base station 100 generates first and second symbol sequences from a first source data to be sent to the first user equipment UE1 and a second source data to be sent to the second user equipment UE2, respectively, and the first and second symbol sequences then are subject to constellation hierarchical modulation, layer-mapping and precoding. The base station 100 not only transmits the precoded data to the first user equipment UE1 and the second user equipment UE2, but also transmits the used precoding matrix and the number of transmission layers to the second user equipment UE2 so that the second user equipment UE2 in the diversity transmission mode can decode the received data. Each of the first user equipment UE1 and the second user equipment UE2 decodes the received data, to obtain respective data.

To be noted, the base station herein shall be construed most extensively, and it shall include various apparatuses forming their own service areas and serving the user equipments in the service areas.

The First Embodiment

Next, the first embodiment of the present invention will be more detailedly described with reference to FIGS. 6 to 12.

Figure 7:
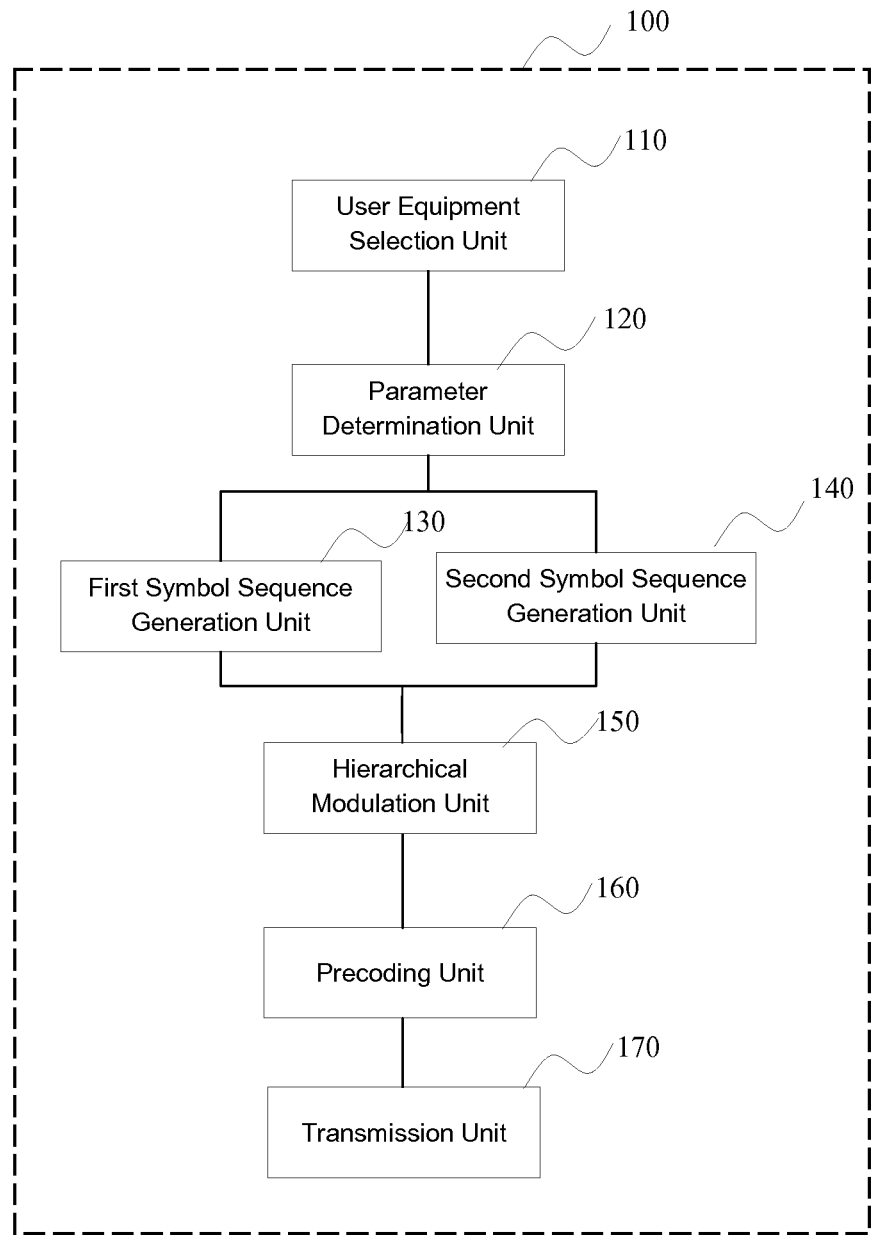
FIG. 7 illustrates an exemplary block diagram of a base station in multi-antenna communication system according to an embodiment of the present invention.

FIG. 7 illustrates an exemplary block diagram of a base station 100 in the multi-antenna communication system according to an embodiment of the present invention. The base station 100 includes: a user equipment selection unit 110 for selecting a first user equipment UE1 and a second user equipment UE2 taking part in hierarchical modulation; a parameter determination unit 120 for determining a modulation mode of hierarchical modulation to be used, the number of transmission layers to be used and a precoding matrix to be used; a first symbol sequence generation unit 130 and a second symbol sequence generation unit 140 for generating a first symbol sequence from first source data to be transmitted to the first user equipment UE1 and a second symbol sequence from second source data to be transmitted to the second user equipment UE2, respectively; a hierarchical modulation unit 150 for performing constellation hierarchical modulation on the first and second symbol sequences to generate a mixed symbol sequence; a precoding unit 160 for layer-mapping and precoding the mixed symbol sequence to generate a transmission signal; and a transmission unit 170 for transmitting the information on the precoding matrix and the number of transmission layers to the second user equipment UE2, while transmitting a transmission signal to the first user equipment UE1 and the second user equipment UE2. A person skilled in the art shall be appreciated that the user equipment selection unit 110, the parameter determination unit 120, the first symbol sequence generation unit 130, the second symbol sequence generation unit 140, hierarchical modulation unit 150, the precoding unit 160 and the transmission unit 170 in the base station 100 may be implemented through either logic circuit(s) or program(s) stored in a machine readable medium.

Figure 8:
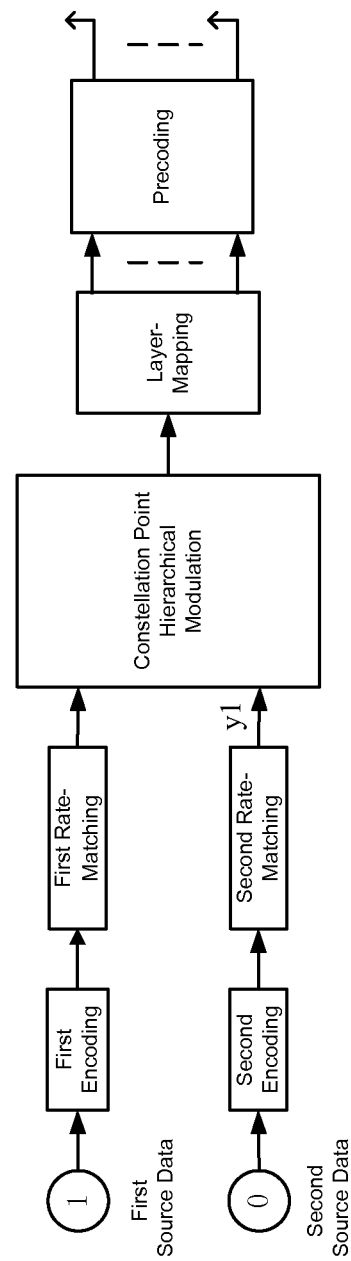
FIG. 8 illustrates a first example of a signal generation flow in the base station.
Figure 9:
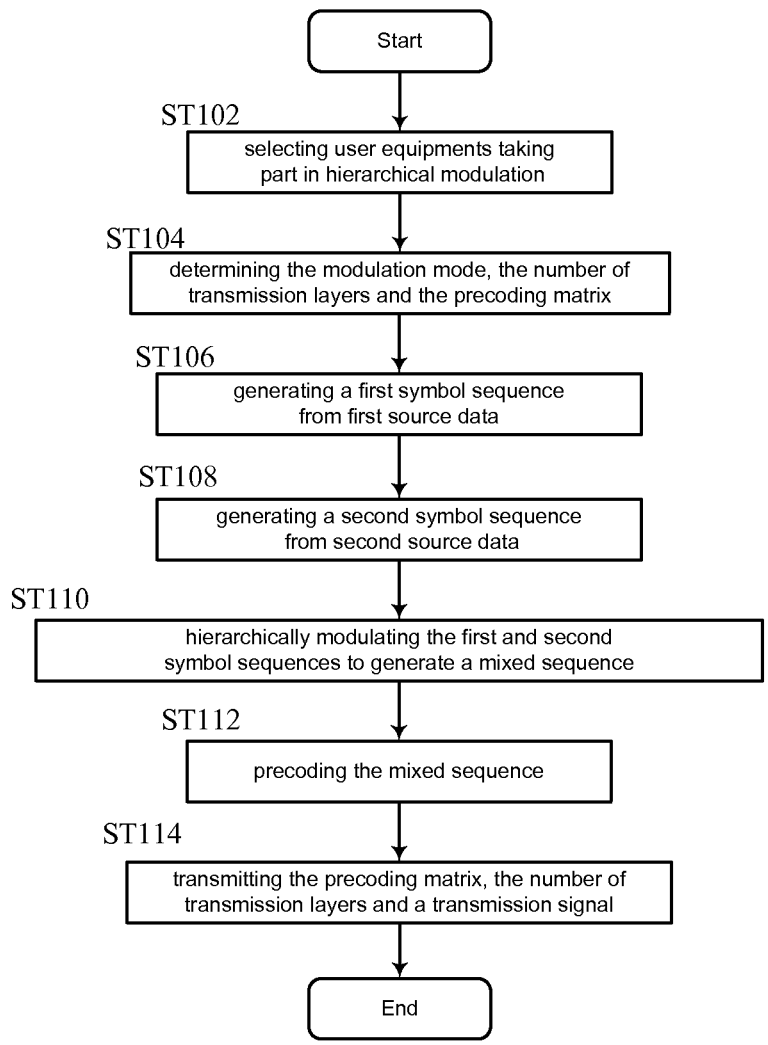
FIG. 9 illustrates a flowchart of a communication method according to an embodiment of the present invention.

Next, the operations of the base station 100 are described with reference to FIGS. 8 and 9. FIG. 8 illustrates a signal generation flow in the base station 100, and FIG. 9 illustrates a flowchart of a communication method according to an embodiment of the present invention.

Firstly, in step ST102, the user equipment selection unit 110 selects a first user equipment UE1 from a first group of candidate user equipments which are configured in a precoding transmission mode, and selects a second user equipment UE2 from a second group of candidate user equipments which are configured in a diversity transmission mode, as the user equipments taking part in hierarchical modulation.

Figure 10:
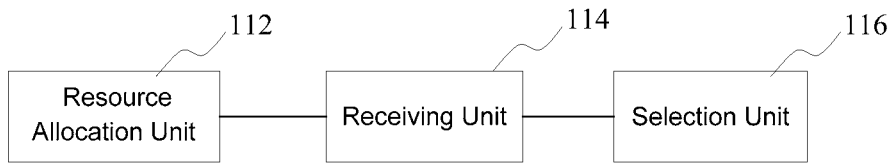
FIG. 10 illustrates a block diagram of an exemplary structure of a user equipment selection unit.
Figure 11:
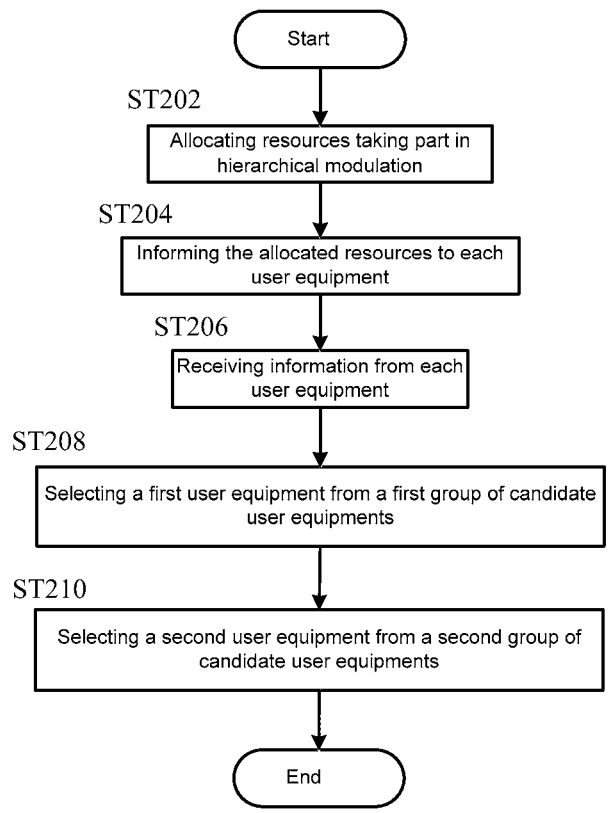
FIG. 11 illustrates an exemplary flowchart of selecting user equipments taking part in hierarchical modulation.

Next, the selections of the user equipments are described in more detail with reference to FIGS. 10 and 11. FIG. 10 illustrates a block diagram of an exemplary structure of the user equipment selection unit, and FIG. 11 illustrates an exemplary flowchart of selecting user equipments taking part in hierarchical modulation.

In step ST202, a resource allocation unit 112 allocates resources taking part in hierarchical modulation to the first and second groups of candidate user equipments. Of course, a person skilled in the art shall be appreciated that the first group of candidate user equipments may be all or a part of user equipments configured in the precoding transmission mode and located in the service area of the base station 100, and the second group of candidate user equipments may be all or a part of user equipments configured in the diversity transmission mode and located in the service area of the base station 100.

In step ST204, the allocated resources are informed to each of candidate user equipments. How to allocate the resources to the candidate user equipments and how to inform the allocated resources to the candidate user equipments are not the invention points of the present invention. And, any proper way for allocating the resources to the candidate user equipments and informing the allocated resources to the candidate user equipments may be selected according to the actual conditions of the multi-antenna communication system.

After the candidate user equipments receive the allocated resources from the base station 100, each of the first group of candidate user equipments configured in the precoding transmission mode estimates its channel quality to generate channel quality information, and determines precoding matrix information to be used in a transmission at the next moment and information of the number of transmission layers to be used in the transmission at the next moment. In which, the precoding matrix information may be either a precoding matrix to be used, or an information from which a precoding matrix to be used at the next moment can be determined by the base station (e.g., the serial number of the precoding matrix in a codebook). Each of the second group of candidate user equipments configured in the diversity transmission mode estimates its channel quality to generate channel quality information, and determines the number of transmission layers to be used in the transmission at the next moment.

Next, in step ST206, a receiving unit 114 receives the information transmitted from each of the candidate user equipments. Specifically, the receiving unit 114 receives channel quality information, precoding matrix information and the number of transmission layers of each of the first group of candidate user equipments configured in the precoding transmission mode, and receives channel quality information and the number of transmission layers of each of the second group of candidate user equipments configured in the diversity transmission mode.

Next, in step 208, a selection unit 116 selects one candidate user equipment from the first group of candidate user equipments as the first user equipment UE1 taking part in hierarchical modulation, and selects one candidate user equipment from the second group of candidate user equipments as the second user equipment UE2 taking part in hierarchical modulation. Preferably, the selection unit 116 selects, from the first group of candidate user equipments, one candidate user equipment of which the channel quality information has a largest value (i.e., the channel quality is best) as the first user equipment UE1 taking part in hierarchical modulation, and selects, from the second group of candidate user equipments, one candidate user equipment of which the channel quality information has a largest value (i.e., the channel quality is best) as the second user equipment UE2 taking part in hierarchical modulation.

After the first user equipment UE1 and the second user equipment UE2 which take part in hierarchical modulation are selected, the flow returns to FIG. 9 to be continued.

In step ST104, the parameter determination unit 120 determines a modulation mode to be used in hierarchical modulation, the number of transmission layers to be used in layer-mapping and a precoding matrix to be used in precoding, according to the channel quality information transmitted by the first user equipment UE1, the precoding matrix information transmitted by the first user equipment UE1 and the number of transmission layers transmitted by the first user equipment UE1, as well as the channel quality information transmitted by the second user equipment UE2 and the number of transmission layers transmitted by the second user equipment UE2.

The modulation mode to be used in hierarchical modulation by the base station 100 may be determined according to the channel quality information transmitted by one of the first user equipment UE1 and the second user equipment UE2, or may be determined according to the channel quality information transmitted by both the first user equipment UE1 and the second user equipment UE2 and/or by considering channel quality information of other user equipment.

The number of transmission layers to be used in layer-mapping may be the number of transmission layers transmitted by one of the first user equipment UE1 and the second user equipment UE2, or may be the number of transmission layers determined from the numbers of transmission layers transmitted by both the first user equipment UE1 and the second user equipment UE2 and/or considering the number of transmission layers for other user equipment.

The precoding matrix to be used in precoding may be determined according to the precoding matrix information transmitted by the first user equipment UE1, or may be determined according to the precoding matrix information transmitted by the first user equipment UE1 and/or by considering a precoding matrix for other user equipment.

For example, the number of transmission layers transmitted by the first user equipment UE1 and the precoding matrix corresponding to the precoding matrix information transmitted by the first user equipment UE1 can be used.

In step ST106, the first symbol sequence generation unit 130 generates a first symbol sequence from first source data to be transmitted to the first user equipment UE1, according to the modulation mode and the number of transmission layers determined by the parameter determination unit 120.

As illustrated in FIG. 8, for the first source data to be transmitted to the first user equipment UE1, the first symbol sequence generation unit 130 performs a first encoding, and then performs a first rate matching according to the rate matching mode defined by the system, so as to generate the first symbol sequence. Since the first user equipment UE1 adopts the precoding transmission mode, the first encoding and the first rate matching performed for the first source data are the same as those performed without considering the hierarchical modulation. The detailed descriptions of the first encoding and the first rate matching are omitted herein.

In step ST108, the second symbol sequence generation unit 140 generates a second symbol sequence from a second source data to be transmitted to the second user equipment UE2, according to the modulation mode and the number of transmission layers determined by the parameter determination unit 120.

Figure 12:
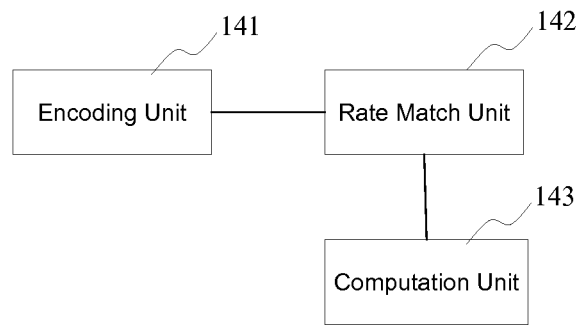
FIG. 12 illustrates a schematic block diagram of a first example of a second symbol sequence generation unit.

Next, step ST108 is described with reference to FIG. 12. FIG. 12 illustrates a first exemplary block diagram of the second symbol sequence generation unit 140. As illustrated in FIG. 12, the second symbol sequence generation unit 140 includes an encoding unit 141, a computation unit 142 and a rate match unit 143. A person skilled in the art shall be appreciated that the encoding unit 141, the computation unit 142 and the rate match unit 143 in the second symbol sequence generation unit 140 may be implemented through either logic circuit(s) or program(s) stored in a machine readable medium.

Figure 5A:
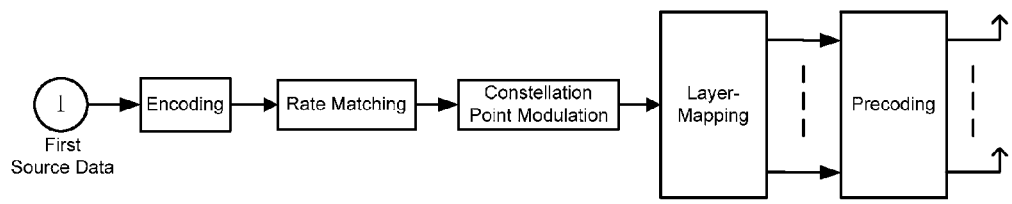
FIGS. 5A and 5B illustrate typical schematic diagrams of conventional multi-antenna precoding transmission and diversity transmission, respectively.
Figure 5B:
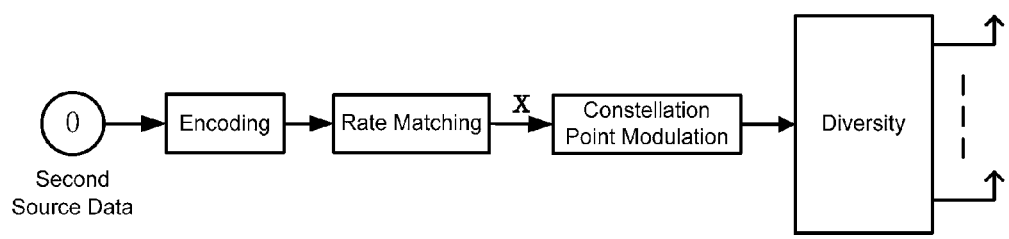

The encoding unit 141 in the second symbol sequence generation unit 140 encodes the second source data to generate encoded data; the computation unit 142 in the second symbol sequence generation unit 140 computes a length of the second symbol sequence to be generated according to the modulation mode and the number of transmission layers determined by the parameter determination unit 120; and the rate match unit 143 in the second symbol sequence generation unit 140 performs a second rate-matching on the encoded data according to the computed length, to generate the second symbol sequence. In which, the second rate-matching may be implemented through truncation or punch of the encoded data. Assuming that the symbol sequence output after the second rate-matching in the conventional diversity transmission as illustrated in FIG. 5B is x, the second symbol sequence output after the second rate-matching as illustrated in FIG. 8 is y1, and the lengths of the second symbol sequence y1 and the symbol sequence x are different from each other. Generally, the length of the second symbol sequence y1 is larger than that of the symbol sequence x under the same conditions except the hierarchical modulation.

Although steps ST106 and ST108 are orderly illustrated in FIG. 8, a person skilled in the art shall be appreciated that steps ST106 and ST108 as illustrated in FIG. 8 may be performed in parallel.

Figure 4:
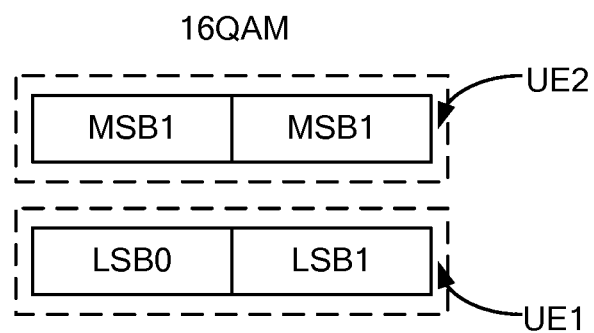
FIG. 4 illustrates conditions of bit mapping for each user equipment during hierarchical modulation.

In step ST110, the rate-matched first and second symbol sequences are subject to constellation hierarchical modulation, so that the first and second symbol sequences are mixed in bit level to generate a mixed data. For example, in the case that the 16 QAM hierarchical modulation as illustrated in FIG. 1 is adopted, the first symbol sequence may be mapped to two LSBs of the 16 QAM constellation points, and the second symbol sequence may be mapped to two MSBs of the 16 QAM constellation points, as illustrated in FIG. 4.

Of course, a person skilled in the art shall be appreciated that the hierarchical modulation may be performed in other manners known at present or to be designed in future.

After the hierarchical modulation, the precoding unit 160 layer-maps the mixed data according to the number of transmission layers determined by the parameter determination unit 120, and precodes the layer-mapped sequence according to the precoding matrix determined by the parameter determination unit 120, to generate a transmission signal. How to layer-map and precode the mixed sequence are not the invention points of the present invention. A person skilled in the art may perform layer-mapping and precoding with methods known at present or to be designed in future according to the actual conditions of the multi-antenna communication system.

In step ST114, the transmission unit 170 informs the second user equipment UE2 of the used precoding matrix and the number of transmission layers, and transmits the transmission signal to the first user equipment UE1 and the second user equipment UE2. In the first user equipment UE1, the received signal is decoded. In the second user equipment UE2, the received signal is decoded according to the received precoding matrix and the number of transmission layers. The transmission unit 170 may inform the second user equipment UE2 through the dedicated pilot or the precoding matrix information manner in the allocated resources.

In addition, if the number of transmission layers and the precoding matrix determined by the parameter determination unit 120 are different from those determined by the first user equipment UE1, the transmission unit 170 also transmits the used precoding matrix and number of transmission layers to the first user equipment UE1. In the first user equipment UE1, the received signal is decoded according to the received precoding matrix and the number of transmission layers.

To be noted, although the steps are orderly numbered in the above description, it shall be noted that the sequences of the steps may be changed and some steps may be performed in parallel.

According to the first embodiment of the present invention, a feasible communication method and corresponding apparatus for selecting user equipments configured in the precoding transmission mode and the diversity transmission mode in a multi-antenna communication system to perform hierarchical modulation are provided.

The Second Embodiment

In first embodiment, the length of the second symbol sequence is computed according to the number of transmission layers and the modulation mode to be used in hierarchical modulation, and then a rate matching is performed to generate a second symbol sequence. But the second embodiment is different from the first embodiment lies in that after the second source data is encoded, the output symbol sequence x is still obtained in the rate matching manner defined by the conventional system without considering hierarchical modulation, then a second encoding is performed on the output symbol sequence x.

Figure 13:
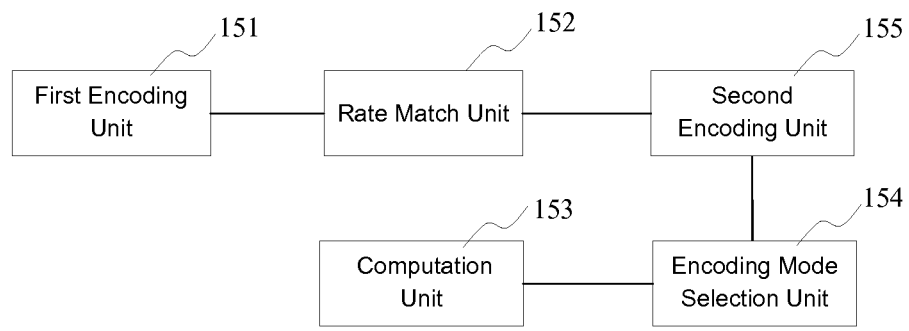
FIG. 13 illustrates a schematic block diagram of a second example of the second symbol sequence generation unit.
Figure 14:
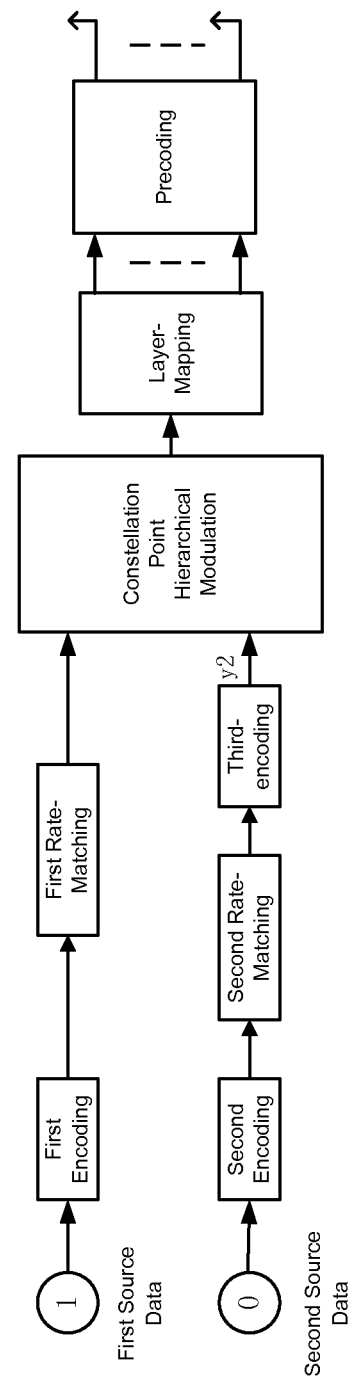
FIG. 14 illustrates a second example of the signal generation flow in the base station.

For briefness, the description of the same parts of the first and second embodiments are omitted. The difference between the first and second embodiments is described in detail as follows with reference to FIGS. 13-14. FIG. 13 illustrates a schematic block diagram of a second symbol sequence generation unit according to the second embodiment. FIG. 14 illustrates a flowchart of signal generation in the base station according to the second embodiment.

The second symbol sequence generation unit 140 includes a first encoding unit 151, a rate match unit 152, a computation unit 153, an encoding mode selection unit 154 and a second encoding unit 155. A person skilled in the art shall be appreciated that the first encoding unit 151, the rate match unit 152, the computation unit 153, the encoding mode selection unit 154 and the second encoding unit 155 in the second symbol sequence generation unit 140 may be implemented through either logic circuit(s) or program(s) stored in a machine readable medium.

Firstly, the first encoding unit 151 performs a first encoding on the second source data, to generate encoded data. Next, the rate match unit 152 performs a rate matching on the encoded data according to a rate matching mode defined by the multi-antenna communication system to generate a third symbol sequence. In which, the third symbol sequence is the same as that generated through rate matching under the conventional diversity transmission mode as illustrated in FIG. 5B, i.e., sequence x. The computation unit 153 computes the length of a second symbol sequence to be hierarchical modulated according to the modulation mode and the number of transmission layers determined by the parameter determination unit 120. The encoding mode selection unit 154 selects a encoding mode according to the computed length. The second encoding unit 155 performs a second encoding on the third symbol sequence according to the selected encoding mode to generate a second symbol sequence y2. The encoding mode selection unit 154 selects such an encoding mode that the length of the second symbol sequence y2 generated by the second encoding unit 155 is the same as that of the second symbol sequence y1 generated by the rate match unit 143 in the first embodiment. Herein the encoding mode may be repetition coding or bit level space time coding, or other channel encoding mode such as Turbo coding, convolution coding. Generally, the contents of the second symbol sequences y1 and y2 are different from each other.

According to the second embodiment, another feasible communication method and corresponding apparatus for selecting user equipments configured in the precoding transmission mode and the diversity transmission mode in the multi-antenna communication system to perform hierarchical modulation are provided.

Modifications

There may be various modifications of the communication method and the base station within the inventive scope.

(1) Before step ST108, the communication method may further comprise selecting to generate a second symbol sequence in the flow as illustrated in FIG. 8 or FIG. 14.

(2) The base station 100 may further include a selection unit, and the second symbol sequence generation unit may include a first subunit and a second subunit, wherein the first subunit has the structure as illustrated in FIG. 12, and the second subunit has the structure as illustrated in FIG. 13. The selection unit may select one of the first and second subunits to generate the second symbol sequence.

(3) The base station 100 may select any one of the user equipments configured in the precoding transmission mode as the first user equipment UE1, select any one of the user equipments configured in the diversity transmission mode as the second user equipment UE2, and inform the first user equipment UE1 and the second user equipment UE2 of the allocated resources. The first user equipment UE1 estimates its channel quality information, determines the precoding matrix information and the number of the transmission layers according to the allocated resources, and feeds back to the base station 100. The second user equipment UE2 estimates its channel quality information and determines the number of the transmission layers according to the allocated resources, and feeds back to the base station 100. Alternatively, the base station 100 may select any of the user equipments configured in the precoding transmission mode as the first user equipment UE1, and select the second user equipment UE2 from the user equipments configured in the diversity transmission mode according to the method as illustrated in FIG. 11 in the first embodiment. Alternatively, the base station 100 may select the first user equipment UE1 from the user equipments configured in the precoding transmission mode according to the method as illustrated in FIG. 11 in the first embodiment, and select any one of the user equipments configured in the diversity transmission mode as the second user equipment UE2.

In addition, the above method may also be implemented through a storage medium containing machine readable program codes. When being executed in a multi-antenna communication system or an information processing system, the program codes enable the multi-antenna communication system or the information processing system to execute the above communication method. The storage medium is non-transitory. However, transitory storage mediums are also invisioned.

In addition, the above method may also be implemented through a program product containing machine executable instructions. When being executed by a multi-antenna communication system or an information processing system, the instructions enable the multi-antenna communication system or the information processing system to execute the above communication method.

A person skilled in the art will appreciate that various exemplary units and steps described in conjunction with the disclosed embodiments can be implemented through hardware, software or a combination thereof. Whether these functions are performed by hardware or software depends on specific application of the technical solution and the design constraint conditions. A professional person may implement the described functions by using different methods for each specific application, but the implementation shall not be deemed as going beyond the scope of the present invention.

The steps of the methods or algorithms described in conjunction with the disclosed embodiments may be implemented through software executed by hardware (logic device such as computer). When being executed, the software enables the hardware (logic device such as computer) to implement the above methods or steps thereof, or act as components of the apparatus according to the present invention. While illustrations may show steps or flow sequences, this sequence or steps is for ease of illustration and does not imply a sequence of events that must occur in a specific order.

The software may be placed in Random Access Memory (RAM), memory, Read Only Memory (ROM), Electrically Programmable ROM (EPROM), Electrically Erasable Programmable ROM (EEPROM), register, hard disk, removable disk, CD-ROM, or any known storage medium of other form in the art.

The above described embodiments are exemplary, rather than limitations to the embodiments of the present invention. A person skilled in the art may conceive of various modifications and changes according to the spirit of the embodiments of the present invention, and those modifications and changes fall within the scope of the embodiments of the present invention.

What is claimed is:

1. A communication method used in a multi-antenna communication system, comprising:
    selecting one from a first group of candidate user equipments which are configured in a precoding transmission mode as a first user equipment, and selecting one from a second group of candidate user equipments which are configured in a diversity transmission mode as a second user equipment;
    determining a modulation mode to be used in hierarchical modulation, the number of transmission layers to be used in layer-mapping and a precoding matrix to be used in precoding, according to a first channel quality information, a precoding matrix information and the first number of transmission layers which are sent by the first user equipment, a second channel quality information and the second number of transmission layers which are sent by the second user equipment;
    generating a first symbol sequence from first source data to be sent to the first user equipment, according to the modulation mode and the number of transmission layers;
    generating a second symbol sequence from second source data to be sent to the second user equipment, according to the modulation mode and the number of transmission layers;
    hierarchically modulating the first and second symbol sequences according to the modulation mode, to generate a mixed symbol sequence;
    layer-mapping and precoding the mixed symbol sequence according to the precoding matrix and the number of transmission layers, to generate a transmission signal; and
    transmitting the transmission signal to the first and second user equipments and informing the second user equipment of the precoding matrix and the number of transmission layers.

2. A communication method according to claim 1, wherein the selecting comprising:
    allocating resources to each of the first group of candidate user equipments and the second group of candidate user equipments and informing each candidate user equipment of the allocated resources;
    receiving the first channel quality information, the precoding matrix information and the first number of transmission layers, which are sent from each of the first group of candidate user equipments, and receiving the second channel quality information and the second number of transmission layers, which are sent from each of the second group of candidate user equipments; and
    selecting, from the first group of candidate user equipments, a candidate user equipment, of which the first channel quality information has a largest value, among the first group of candidate user equipments, as the first user equipment, and selecting, from the second group of candidate user equipments, a candidate user equipment, of which the second channel quality information has a largest value among the second group of candidate user equipments, as the second user equipment.

3. A communication method according to claim 1, wherein the generating the second symbol sequence comprising:
    encoding the second source data to generate encoded data;
    computing a length of the second symbol sequence according to the modulation mode and the number of transmission layers; and
    rate-matching the encoded data according to the length, to generate the second symbol sequence.

4. A communication method according to claim 1, wherein the generating the second symbol sequence comprising:
    first-encoding the second source data to generate encoded data;
    rate-matching the encoded data according to a rate matching manner defined by the multi-antenna communication system, to generate a third symbol sequence;
    computing a length of the second symbol sequence, according to the modulation mode and the number of transmission layers;
    selecting an encoding mode according to the length; and
    second-encoding the third symbol sequence according to the encoding mode, to generate the second symbol sequence.

5. A communication method according to claim 4, wherein the encoding mode is repetition coding, bit level space time coding, Turbo coding or convolution coding.

6. A method according to claim 1, wherein the method is implemented by a multi-antenna communication system.

7. A base station, comprising:
    a user equipment selection unit, for selecting one from a first group of candidate user equipments which are configured in a precoding transmission mode as a first user equipment, and selecting one from a second group of candidate user equipments which are configured in a diversity transmission mode as a second user equipment;
    a parameter determination unit, for determining a modulation mode to be used in hierarchical modulation, the number of transmission layers to be used in layer-mapping and a precoding matrix to be used in precoding, according to a first channel quality information, a precoding matrix information and the first number of transmission layers which are sent by the first user equipment, a second channel quality information and the second number of transmission layers which are sent by the second user equipment;

a first symbol sequence generation unit, for generating a first symbol sequence from first source data to be sent to the first user equipment, according to the modulation mode and the number of transmission layers;

a second symbol sequence generation unit, for generating a second symbol sequence from second source data to be sent to the second user equipment, according to the modulation mode and the number of transmission layers;

a hierarchical modulation unit, for hierarchically modulating the first and second symbol sequences according to the modulation mode, to generate a mixed symbol sequence;

a precoding unit, for layer-mapping and precoding the mixed symbol sequence according to the precoding matrix and the number of transmission layers, to generate a transmission signal; and a transmission unit, for transmitting the transmission signal to the first and second user equipments and informing the second user equipment of the precoding matrix and the number of transmission layers.

8. A base station according to claim 7, wherein the user equipment selection unit comprising:

a resource allocation unit for allocating resources to each of the first group of candidate user equipments and the second group of candidate user equipments and informing each candidate user equipment of the allocated resources;

a receiving unit, for receiving the first channel quality information, the precoding matrix information and the first number of transmission layers, which are sent from each of the first group of candidate user equipments, and receiving the second channel quality information and the second number of transmission layers, which are sent from each of the second group of candidate user equipments; and a selecting unit, for selecting, from the first group of candidate user equipments, a candidate user equipment of which the first channel quality information has a largest value among the first group of candidate user equipments, as the first user equipment, and selecting, from the second group of candidate user equipments, a candidate user equipment of which the second channel quality information has a largest value among the second group of candidate user equipments, as the second user equipment.

9. A base station according to claim 7, wherein the second symbol sequence generation unit comprising:

an encoding unit, for encoding the second source data to generate encoded data;

a computation unit, for computing a length of the second symbol sequence according to the modulation mode and the number of transmission layers; and a rate match unit for rate-matching the encoded data according to the length, to generate the second symbol sequence.

10. A base station according to claim 7, wherein the second symbol sequence generation unit comprising:

a first encoding unit, for first-encoding the second source data to generate encoded data;

a rate match unit, for rate-matching the encoded data according to a rate matching manner defined by the multi-antenna communication system, to generate a third symbol sequence;

a computation unit, for computing a length of the second symbol sequence, according to the modulation mode and the number of transmission layers;

an encoding mode selection unit, for selecting an encoding mode according to the length; and a second encoding unit, for second-encoding the third symbol sequence according to the encoding mode, to generate the second symbol sequence.

11. A base station according to claim 10, wherein the encoding mode is repetition coding, bit level space time coding, Turbo coding or convolution coding.

12. A non-transitory storage medium comprising machine-readable program codes, being executed in a multi-antenna communication system or an information processing system to enable the multi-antenna communication system or the information processing system to execute a method comprising:

selecting one from a first group of candidate user equipments which are configured in a precoding transmission mode as a first user equipment, and selecting one from a second group of candidate user equipments which are configured in a diversity transmission mode as a second user equipment;

determining a modulation mode to be used in hierarchical modulation, the number of transmission layers to be used in layer-mapping and a precoding matrix to be used in precoding, according to a first channel quality information, a precoding matrix information and the first number of transmission layers which are sent by the first user equipment, a second channel quality information and the second number of transmission layers which are sent by the second user equipment;

generating a first symbol sequence from first source data to be sent to the first user equipment, according to the modulation mode and the number of transmission layers;

generating a second symbol sequence from second source data to be sent to the second user equipment, according to the modulation mode and the number of transmission layers;

hierarchically modulating the first and second symbol sequences according to the modulation mode, to generate a mixed symbol sequence;

layer-mapping and precoding the mixed symbol sequence according to the precoding matrix and the number of transmission layers, to generate a transmission signal; and transmitting the transmission signal to the first and second user equipments and informing the second user equipment of the precoding matrix and the number of transmission layers.

13. A method according to claim 1, wherein the method is implemented by a non-transitory storage medium comprising machine-executable instructions, being executed by a multi-antenna communication system or an information processing system, to enable the multi-antenna communication system or the information processing system.

* * * * *